F. SEITZ.
Mash Apparatus.
No. 8,665.
Patented Jan. 20, 1852.
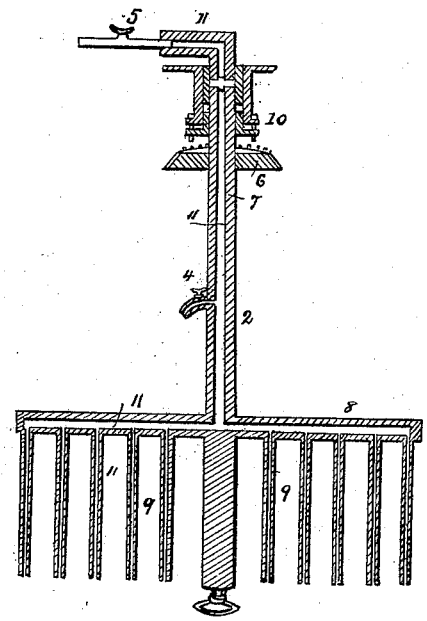
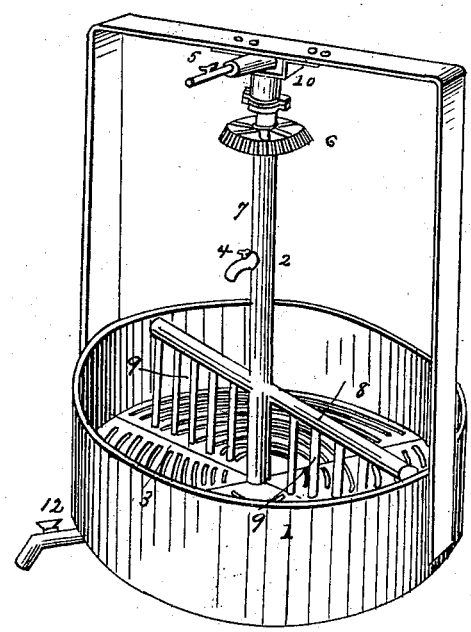

UNITED STATES PATENT OFFICE.

FREDK. SEITZ, OF EASTON, PENNSYLVANIA.

PROCESS OF MASHING MAIZE.

Specification of Letters Patent No. 8,665, dated January 20, 1852.

*To all whom it may concern:*

Be it known that I, FREDK. SEITZ, of Easton, in the county of Northampton and State of Pennsylvania, have invented an Improvement on the Mode of Preparing Corn for Brewing and Distilling, by which improvement all the starch of the corn is liberated (burst open) for the action of the diastaste of the malt and by which improvement I am enabled to use two parts of corn to one of malt, by weight, for beer, ale, and porter, and to make one barrel of ale showing seventy-five pounds of sugar, if weighed by Dicase's sacharometer, from thirty-six pounds of malted barley and sixty pounds of raw or kiln-dried cornmeal, most brewers now using two and a half bushels of the best of barley malt to make a barrel of such ale and many of them three bushels. It also enables me to produce from sixty pounds of so prepared cornmeal, including the usual quantity of malt, nineteen to twenty quarts of proof whisky, distillers now never getting over sixteen to seventeen quarts from sixty pounds of corn, including the usual quantity or even more malt. Now this is accomplished by the starch of the corn being all developed, liberated, dissolved, and prepared for the full action of the diastaste (the principle in the malt that converts grain starch and gum into sugar) of the malt, and by my improved mashing and steaming machine, which enables me to keep up the proper converting heat in the mash at pleasure, of which machine a correct description follows in this specification, reference being had to the accompanying drawings and to the letters or figures of reference thereon marked.

Now to enable others skilled in brewing and distilling to make use of my improvement I will first describe the usual mode of treating corn chop (meal) and the improvement which I claim as my own as well as the improvement on the mashing and steaming machine.

The usual way (and my way at the commencement) is to take sixty pounds of cornmeal and mash it with 10 gallons of water 160 to 180 Fahrenheit and when well mixed to add 20 gallons or more of water at 212 Fahrenheit (boiling) again mashing and mixing it well, now leaving it rest to steep at about 175 Fahrenheit (the starch of the corn though requiring a boiling heat for some hours to become all liberated) now the distiller after his mash having rested, steeped, for one hour at about 175 degrees commences stirring and cooling it down to 145 degrees Fahrenheit (the proper heat for mashing the rye and malt chop into the corn mash) but now after he mashes (mixes) his rye and malt with his corn mash his heat is 25 degrees too low (being now down to 135 or 140 degrees) the proper converting heat being 160 to 167 degrees and he is not able to raise it except by my improved mashing and steaming machine for by raising it by any other means he will apply too much heat in one spot and by that means kill the diastaste, which will not bear over 160 to 167 degrees to keep it in action and which requires the heat to be raised in the most delicate manner by my machine as it is in motion in the mash and as hereafter described.

Now my mode and my improvement is this: I commence mashing precisely as the common distiller does and as above described but when done mashing instead of leaving the mash stand one hour to soak or steep at 175 degrees I run it (the corn mash) into a boiler of wood or iron and boil it by steam until the corn is all dissolved and the starch all liberated, into a complete jelly—the steam is admitted by a pipe from the steam boiler running to the bottom of the wooden boiler the same as distillers boil their stills or their water for mashing, being in the usual way of boiling by steam, and not requiring any pressure at all although pressure would shorten the process of boiling but which I don't claim; now the corn being all dissolved and boiled sufficient it is run into the mashing tub, Figure 1, in the drawing, which contains the mashing and steaming apparatus on my improved plan, Fig. 2, with the usual false bottom (or strainer) for brewing ale, Fig. 3, (the distiller don't filter his wort and wants no false bottom), the vacuum cock, Fig. 4, being now opened which must always be done when the steam is stopped off the machine by the cock, Fig. 5, and the vacuum formed, it is done to prevent the air from forcing the mash upward into the hollow pins arms and shaft of the machine which is now put in motion by the wheel Fig. 6, (shows full on the lower and half on the upper drawing above) with steam passing through its hollow upright shaft Fig. 7. hollow horizontal arms Fig. 8, and hollow pins or teeth Fig. 9, it is kept in motion the upright shaft revolving steam tight in the stuffing box Fig. 10, until the mash is stirred and cooled down to 145 or 150 degrees Fahrenheit, when the machine still going the ground rye and malt is mashed into the corn which when done has reduced the heat to 135 or 140 degrees (therefor 25 degrees too low) now while the machine keeps going and as soon as all is well mixed and incorporated the steam cock, Fig. 5, is opened the vacuum cock, Fig. 4, is shut and the steam passed through the shaft arms and pins (see steam passage, Fig. 11) into the mash itself until the heat is gradually raised from 155 to 165 degrees, the point at which starch and gum of grain most rapidly convert into sugar, the mash now left to steep and sachrise (sweeten) for two to three hours when it is proceeded with again in the common way in all distilleries for cooling down and fermenting.

For brewing beer, ale, and porter the process is precisely the same with the corn, and the claim the same viz: to be enabled to use one half to two-thirds raw or kinldried cornmeal by having first boiled to a jelly as above described, the malt mashed in in the same way, and the lost heat recovered and raised to the converting point of 155 to 165 degrees as described above for distilling, the process, including the novel use of $\frac{1}{5}$ the bulk of the malt of finely cut straw in the mash of the brewer for making it more porous and more apt to filter through the false bottom, after which every thing is proceeded with as usually done in all breweries.

Now what I claim as my invention and improvement in the brewing and distilling business and desire to secure by Letters Patent is—

The above specified preparation and boiling of the corn for brewing and distilling, boiling it to a jelly, before the malt or rye is mashed into it giving a much larger than the usual yield from cheaper material, by enabling me to use one half to two-thirds corn for beer, ale, and porter, and to make 19 quarts of whisky from 60 pounds of corn (including the usual quantity of malt only and no rye) and 21 quarts with rye, as specified.

FREDK. SEITZ.

Witnesses:
  DAVE BLACK,
  PETER BALDY.